O. GRENIER.
NON-PNEUMATIC ELASTIC TIRE FOR VEHICLE WHEELS.
APPLICATION FILED OCT. 11, 1910.
1,005,962. Patented Oct. 17, 1911.
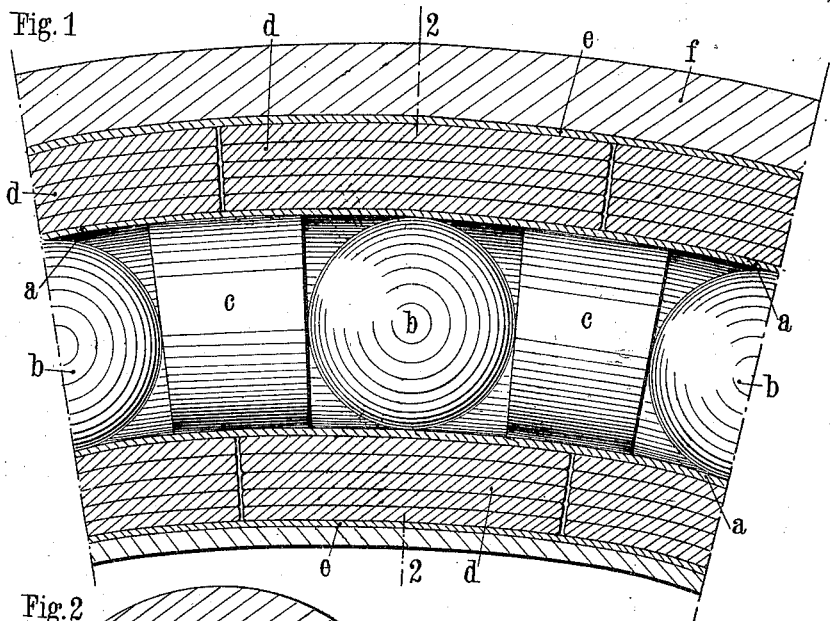
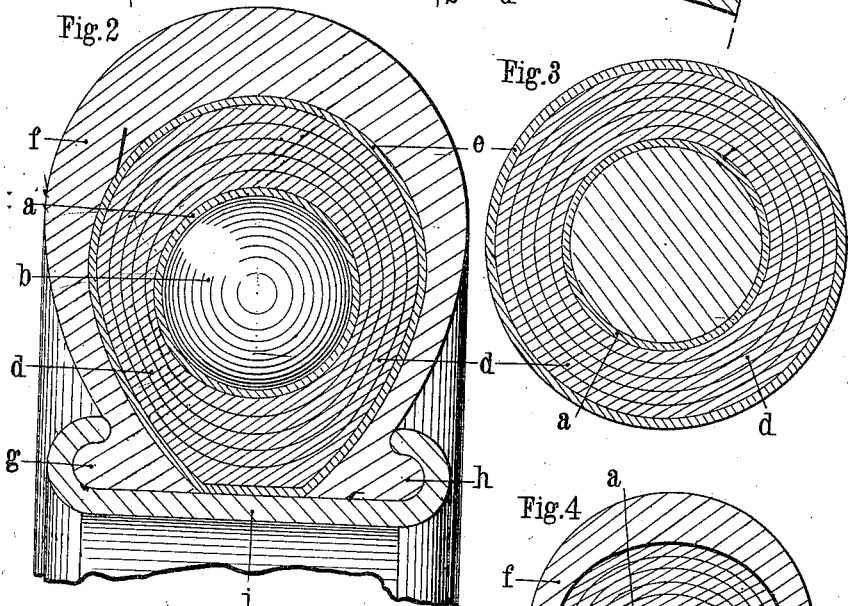
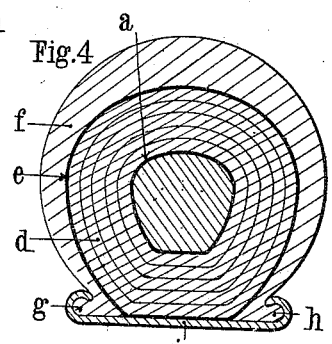

UNITED STATES PATENT OFFICE.

OSCAR GRENIER, OF BOULOGNE-ON-THE-SEINE, FRANCE.

NON-PNEUMATIC ELASTIC TIRE FOR VEHICLE-WHEELS.

1,005,962.     Specification of Letters Patent.     Patented Oct. 17, 1911.

Application filed October 11, 1910. Serial No. 586,451.

*To all whom it may concern:*

Be it known that I, OSCAR GRENIER, of 100 Avenue Victor Hugo, Boulogne-on-the-Seine, France, engineer, have invented certain new and useful Improvements in and Relating to Non-Pneumatic Elastic Tires for Vehicle-Wheels, of which the following is a specification.

This invention relates to non-pneumatic elastic tires for vehicle wheels, and has for object the improvements therein hereinafter described and pointed out in the claim.

The invention consists in an improved non-pneumatic elastic tire for vehicle wheels having inside the customary tread cover an elastic filling tube containing interior core pieces, elastic or otherwise, which filling tube is covered with independent elastic strips for the purpose of permitting the parts to slide over each other when the type is undergoing deformation, without molecular tearing apart, and of obtaining flexibility and elasticity in every part of the tire.

One constructional form of the improved tire is shown by way of example in the accompanying drawings.

Figure 1 is a longitudinal section of the tire. Fig. 2 is a transverse section on the line 2—2 Fig. 1. Fig. 3 is a transverse section showing the interior filling of the tire. Fig. 4 is a transverse section of the tire when under a load.

Inside a tube $a$ made for example of canvas are lodged balls $b$ preferably of india rubber separated by cylindrical plugs $c$ of the same diameter also of india rubber, so as to constitute a cylindrical core around which are wrapped strips or bands $d$ of an elastic material preferably rubber suitably cut and arranged side by side in such a number as to completely cover the tube $a$. The whole is covered by a tube $e$ of canvas, india rubber or other suitable material. In this manner a filling tube is obtained presenting a transverse section of the form illustrated in Fig. 3, and of external appearance of a pneumatic tire when filled with air. This tube is lodged in the usual tread cover $f$ having beadings $g$, $h$ engaging in corresponding grooves in the rim $i$. The tube is thus compressed and assumes the form left free in the interior of the cover as shown in Fig. 2, the beadings of the cover being pressed into their grooves by the elasticity of the tube.

When the tire supports a certain load the pressure withstood by the tread cover $f$ is transmitted to the strips $d$ causing compression and relative slipping of these strips, and the whole inner tube is deformed as shown in Fig. 4, but still completely filling up the tread cover $f$, while at the same time the beadings $g$, $h$ are strongly pressed into their grooves. During the rotation of the wheels each section of the inner tire assumes the form represented in Fig. 4, on coming into contact with the ground and subsequently returns to the form illustrated in Fig. 2 owing to the elasticity of the strips $d$ and that of the core pieces in the inner tube.

The improved tire has the following advantages. The inner tube whose constituent elements are deformable and contain intermediate empty spaces which lessen its weight, possesses great flexibility receives the shock of any obstacle and constantly maintains the outer cover $f$ expanded through the central core under the effect of the load becomes displaced and compresses the rubber strips $d$ in all directions.

The inner tube may be easily adapted to filling existing covers whose molds might be changed owing to the work that they have undergone; for this purpose the section of the inner tube is modified in corresponding manner by varying the number of its exterior wrappings so that the cover will inclose a larger or smaller quantity of india rubber. The sheets of flexible india rubber forming the periphery of the inner tube may be cut from the air tubes of disused pneumatic tires which have lost none of their initial elasticity, so that the invention also has the advantage of providing a use for rubber of light density which is not fatigued and extremely flexible, such india rubber in spite of its superior quality having been formerly considered only a waste product.

The inner tube being constituted by a series of sections of the width of the wrapping strips $d$, which each work independently, the tire is more flexible, and as the sheets of superposed india rubber stretch and contract under the action of the outside forces which cause the sliding of the parts over each other without molecular tearing, flexibility and elasticity is obtained through the whole depth of the inner tube without the creation of any opposing action tending to produce tearing, as is the case for example in solid rubber tires in which the parts in contact with the load to be supported work 5 alone.

When the tires show signs of wear the worn parts can easily be changed, or the direction of rolling reversed so that the inner tube will retain its original qualities. 10 The core might also be formed of non-elastic pieces or of members of reduced elasticity such as wood or cork according to the results desired.

The invention is applicable to the wheels 15 of vehicles of any character and more particularly to the wheels of motor cars.

I claim—

In a non-pneumatic elastic tire for vehicle wheels the combination of an inner tube, balls and plugs embedded in said 20 tube, single strips made of suitable material and forming independent sections wrapped around said tube and an outer tube inclosing the whole and a tread cover adapted to receive the outer tube. 25

In testimony whereof I have hereunto placed my hand at Paris France this 29th day of September 1910.

OSCAR GRENIER.

In the presence of two witnesses:
H. C. COXE,
HENRY SCHWAB.

---

Copies of this patent may be obtained for five cents each, by addressing the "Commissioner of Patents, Washington, D. C."